United States Patent [19]

Tsubota

[11] Patent Number: 5,089,902
[45] Date of Patent: Feb. 18, 1992

[54] READER APPARATUS FOR READING AN IMAGE FORMED ON AN ORIGINAL PLACED ON AN ORIGINAL TABLE

[75] Inventor: Junichi Tsubota, Yokohama, Japan

[73] Assignee: Kabushiki Kaisha Toshiba, Kawasaki, Japan

[21] Appl. No.: 629,709

[22] Filed: Dec. 18, 1990

[30] Foreign Application Priority Data

Dec. 28, 1989 [JP] Japan .................................. 1-344418

[51] Int. Cl.⁵ .............................................. H04N 1/04
[52] U.S. Cl. .................................. 358/497; 358/412; 355/235
[58] Field of Search ............... 358/409, 410, 412, 413, 358/414, 474, 496, 497; 382/65, 67; 355/234, 235

[56] References Cited

U.S. PATENT DOCUMENTS 4,149,196 4/1979 Wada et al. ........................ 358/286
4,426,149 1/1984 Kuemmel et al. ...................... 355/8
4,628,368 12/1986 Kurata et al. ........................ 358/293
5,001,410 5/1991 Ono .................................... 318/696

Primary Examiner—Leo H. Boudreau
Assistant Examiner—Steven Klocinski
Attorney, Agent, or Firm—Finnegan, Henderson, Farabow, Garrett, and Dunner

[57] ABSTRACT

An original reader apparatus for reading an image formed on an original placed on an original table by moving a fluorescent lamp, an optical system, a photoelectric converter and the like disposed on a carriage. The timing of driving a stepping motor for moving the carriage is controlled by use of a 1/n-line synchronization timing signal during both an acceleration operation and a constant speed operation, thereby smoothly moving the carriage along the axis perpendicular to the axis along which the photoelectric converter reads an original, without deviation of the timing when an acceleration operation is changed to a constant speed operation.

5 Claims, 6 Drawing Sheets

READER APPARATUS FOR READING AN IMAGE FORMED ON AN ORIGINAL PLACED ON AN ORIGINAL TABLE

BACKGROUND OF THE INVENTION

1. Field of the Invention

This invention relates to an original reader apparatus which controls the drive timing of a stepping motor for moving a carriage including a fluorescent lamp, an optical system, a photoelectric converter and the like, in the sub-scanning direction, i.e., along the axis perpendicular to that along which the photoelectric converter reads the original.

2. Description of the Related Art

An original reader apparatus reads an original placed on an original table by moving a carriage on which an original scanning section is mounted. The original scanning section includes a fluorescent lamp, an optical system, a photoelectric converter, and the like. The fluorescent lamp irradiates an original, the light reflected by the original or transmitted therethrough travels via the optical system comprising an optical focusing lens to the photoelectric converter constituted by a CCD line image sensor.

The carriage having the optical system and the like is moved in the sub-scanning direction, i.e., along the axis perpendicular to that along which the photo electric converter reads the original, by a stepping motor which operates in response to a cock signal supplied from a CPU (Central Processing Unit) during an acceleration operation, and operates in synchronism with a 1-line synchronization timing signal during a constant speed operation. When the driving of the stepping motor is changed from an acceleration operation to a constant speed operation, the drive timing may deviate. If this occurs, the acceleration operation cannot be changed smoothly to the constant speed operation, thereby causing vibration of the carriage and step out of the stepping motor.

If the stepping motor is accelerated in synchronism with a 1-line synchronization timing signal, the drive timing in an acceleration operation may change abruptly, (i.e., the pulse width may be reduced abruptly), making smooth acceleration impossible.

SUMMARY OF THE INVENTION

It is accordingly an object of the present invention to provide an original reader apparatus for reading an original placed on an original table by moving a carriage comprising a fluorescent lamp, an optical system, a photoelectric converter, and the like, such that the carriage can move smoothly along the axis perpendicular to the axis along which the photoelectric converter reads original image, and vibration of the carriage and step out of the stepping motor for moving the carriage are prevented.

The original reader apparatus of the present invention comprises first means for generating a first pulse of a predetermined frequency; reading means for reading line by line an original in synchronism with the first pulse; second means, for generating, in synchronism with the first pulse, a second pulse of a frequency higher than that of the first pulse; third means, for generating a third pulse in synchronism with the second pulse, the frequency of said third pulse varying from a value less than that of the first pulse to a constant value greater than that; and moving means for moving step by step, in accordance with the frequency of the third pulse, said reading means relative to said orignal, along an axis perpendicular to that along which the reading means reads the original.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

Figure 1:
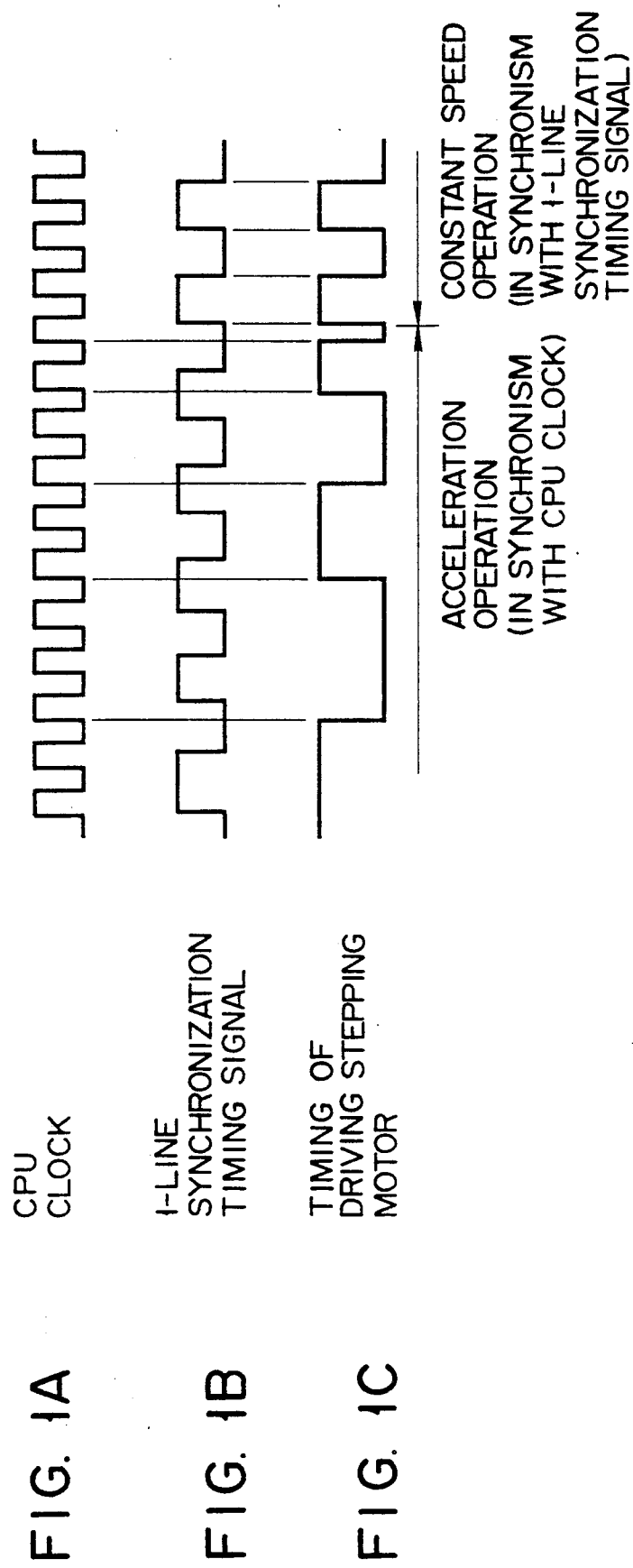
FIGS. 1A to 1C are timing charts for explaining the drive timing of a conventional stepping motor.
Figure 2:
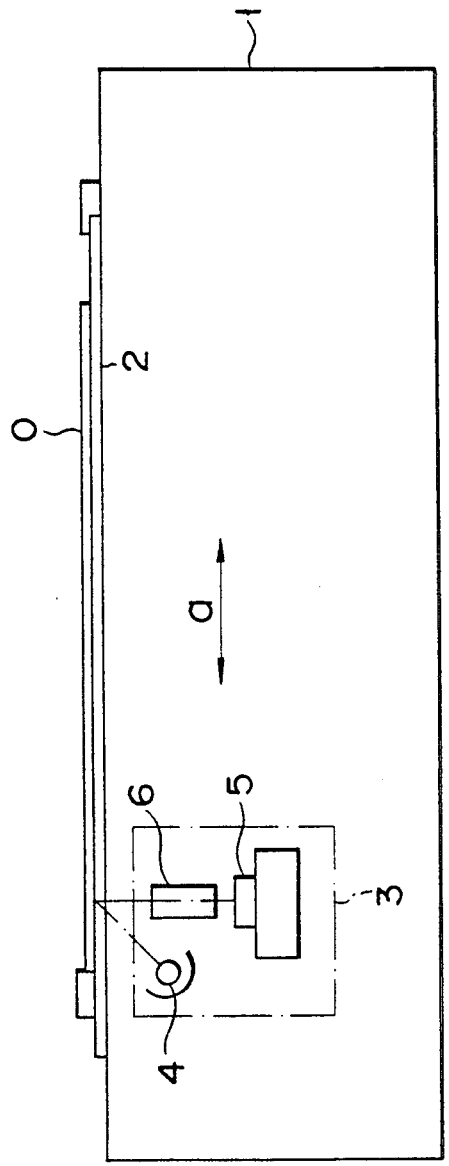
FIG. 2 is a schematic view showing an internal structure of an original reader apparatus according to an embodiment of the present invention.
Figure 3:
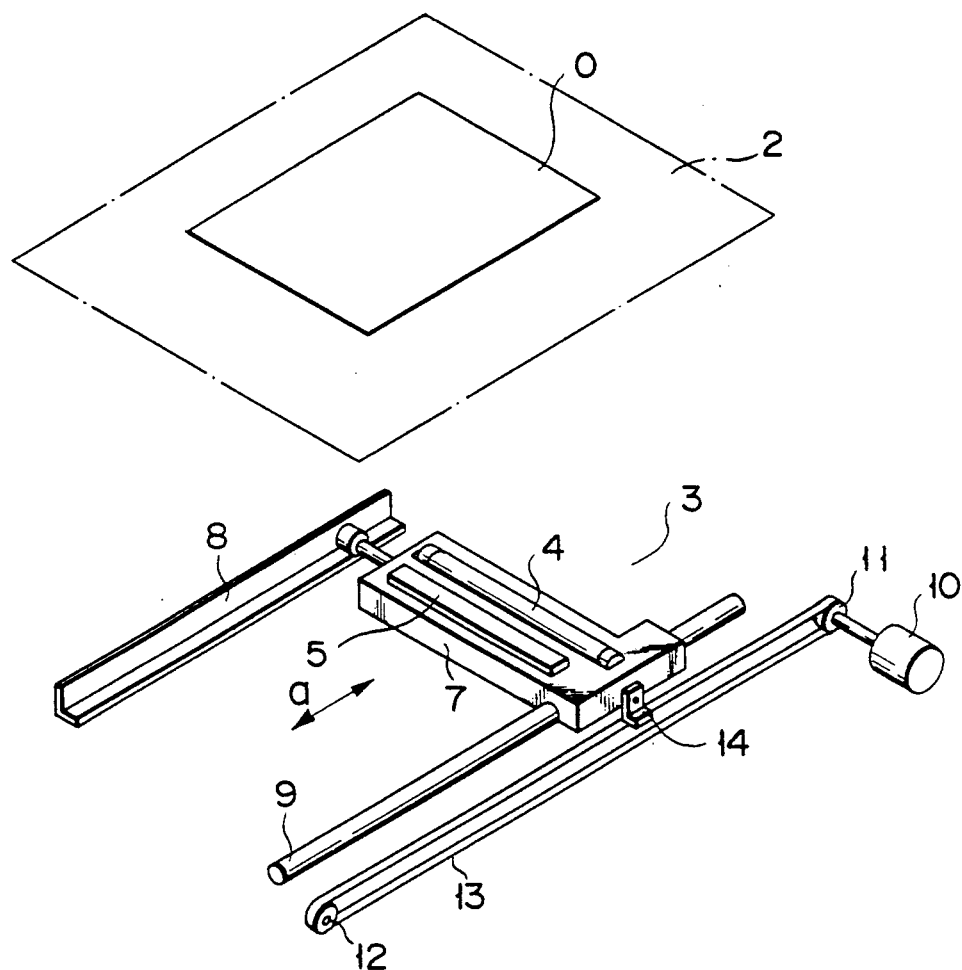
FIG. 3 is a perspective view showing an original scanning section of the original reader apparatus show in FIG. 2.

FIGS. 2 and 3 are schematic views of an original reader apparatus according to an embodiment of the present invention.

As shown in these Figures, an operation panel (not shown) is provided on the front portion of the upper surface of scanner body 1, to which is fixed an original table (platen glass) 2 formed of clear glass.

Scanner body 1 includes original scanning section 3, which is provided under original table 2 and reciprocated in the direction indicated by arrows a shown in FIGS. 2 and 3, to optically scan an original 0 set on table 2. Scanning section 3 includes a fluorescent lamp 4 for irradiating original 0, photoelectric converter 5 which receives the light reflected by or transmitted through original 0, optical system 6 constituted by a light conversion lens for guiding the reflected or transmitted light to photoelectric converter 5, and carriage 7 which supports the above elements.

Photoelectric converter 5 photo-electrically converts the light reflected from or transmitted through original 0, thereby outputting the image of original 0 as an electric signal, and is generally constituted by a CCD line image sensor, for example.

As shown in FIG. 3, carriage 7 is guided in reciprocal manner in the direction indicated by the arrows a, by means of guide rail 8 and guide shaft 9. The axis of the arrows a is perpendicular to the axis along which photoelectric converter 5 reads an original; in other words, the arrows a extend in the sub-scanning direction. Driving pulley 11 is provided on the side of an end of guide shaft 9, and coupled driving pulley 12 on the side of the other end thereof. Driving pulley 11 is driven by stepping motor 10 serving as a scanning motor which rotates reversibly. Timing belt 13 is stretched between driving pulley 11 and coupled driving pulley 12. A point of timing belt 13 is fixed to carriage 7 by fixing member 14, whereby carriage 7 is movable linearly by rotating stepping motor 10 in one or other direction.

Figure 4:
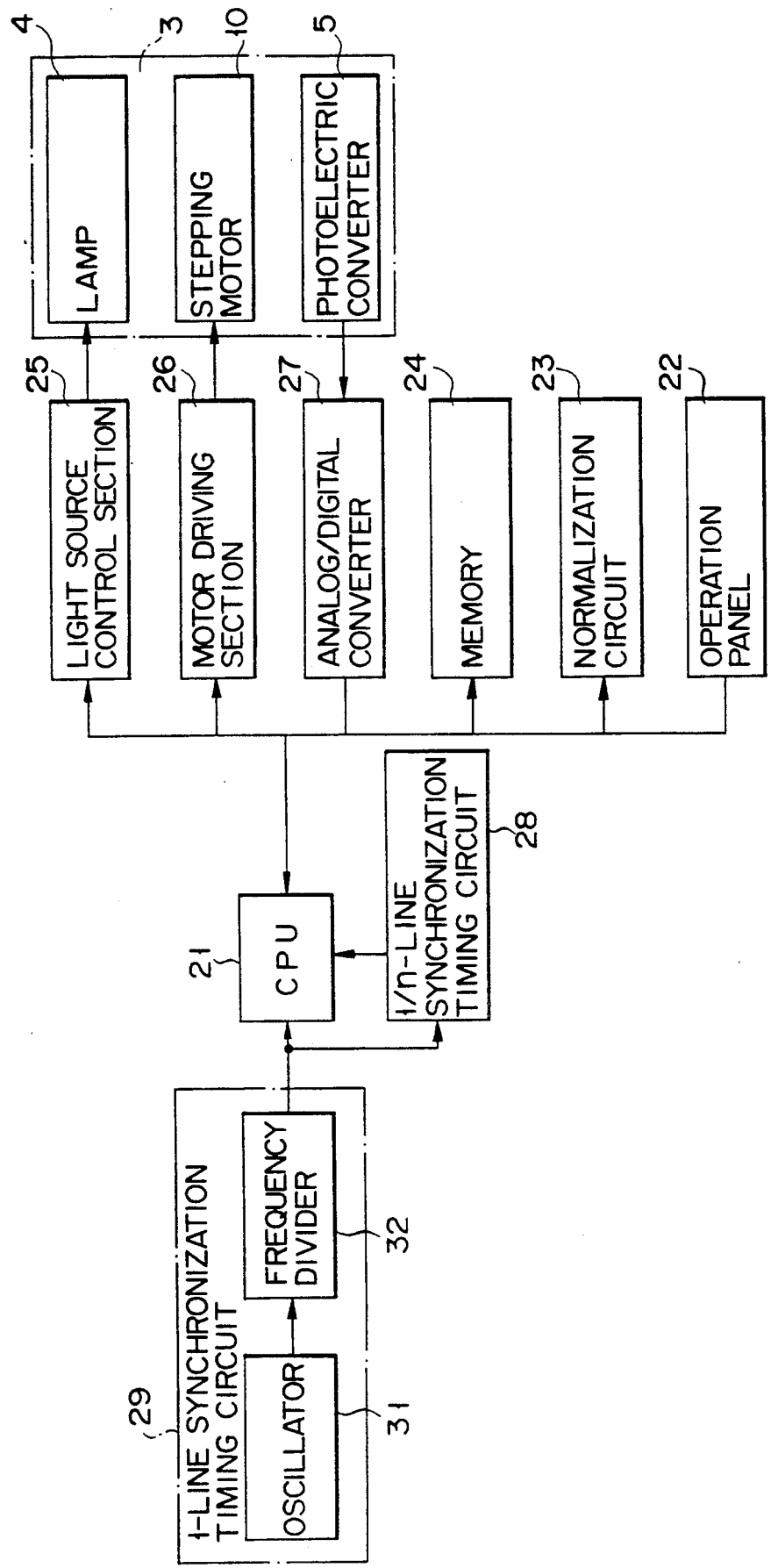
FIG. 4 is a schematic block diagram showing the structure of the original reader apparatus shown in FIG. 2.

FIG. 4 is a schematic view showing the entire control system of the present invention. CPU (Central Processing Unit) 21, which controls the entire apparatus, is connected to operation panel 22, normalization circuit 23, memory 24, light source control section 25, motor driving section 26, analog/digital converter 27, 1/n line frequency divider and synchronization timing circuit 28, and 1-line synchronization timing circuit 29.

Operation panel 2 is constituted by keys for instructing the start of an operation for reading original O. Normalization circuit 23 performs normalization of an output of the photoelectric converter 5 on the basis of reference data stored in memory 24 and image data, i.e., digital data obtained by analog-to-digitally converting the light reflected from original O.

Light source control section 25 is connected to lamp 4 and controls the lighting and the quantity of light. Motor driving section 26 is connected to stepping motor 10 and drives it. Analog/digital converter 27 is connected to photoelectric converter 5, converts an electric signal supplied therefrom to a digital signal, and outputs it to CPU 21.

Figure 5:
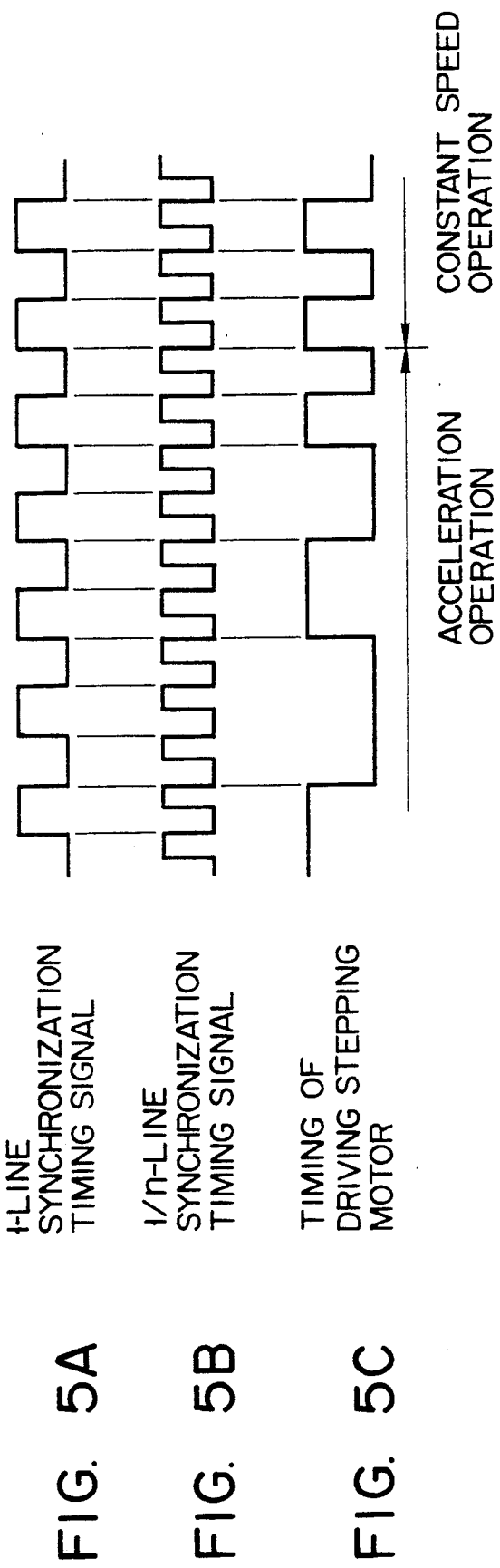
FIGS. 5A to 5C are timing charts for explaining the drive timing of a stepping motor of the original reader apparatus shown in FIG. 2.

1-line synchronization timing circuit 29 includes oscillator 31 and frequency divider 32, and frequency-divides an oscillation signal supplied from oscillator 31, and generates a 1-line synchronization timing signal as shown in FIG. 5A.

1/n-line frequency divider and synchronization timing circuit 28 divides a 1-line synchronization timing signal into two parts, for example, and generates a ½-line synchronization timing signal as shown in FIGS. 5B. The value of n may be an integer other than 2.

CPU 21 causes motor driving section 26 to operate in response to ½-line synchronization timing signal supplied from 1/n-line synchronization timing signal 28, thereby causing stepping motor 10 to be rotated at an accelerated speed or a constant speed. CPU 21 also causes photoelectric converter 5 to perform photoelectric conversion of a line, in synchronism with a 1-line synchronization timing signal supplied from 1-line synchronization timing circuit 29.

As described above, the timing of driving stepping motor 10 during both an acceleration operation and a constant speed operation is controlled by use of a ½-line synchronization timing signal, thereby preventing deviation of the timing when an acceleration operation is changed to a constant speed operation. As a result, vibration of carriage 7 and step out of stepping motor 10 are prevented, and carriage 7 is moved smoothly in the sub-scanning direction, and without deviation of the timing when an acceleration operation is changed to a constant speed operation mode.

Figure 6:
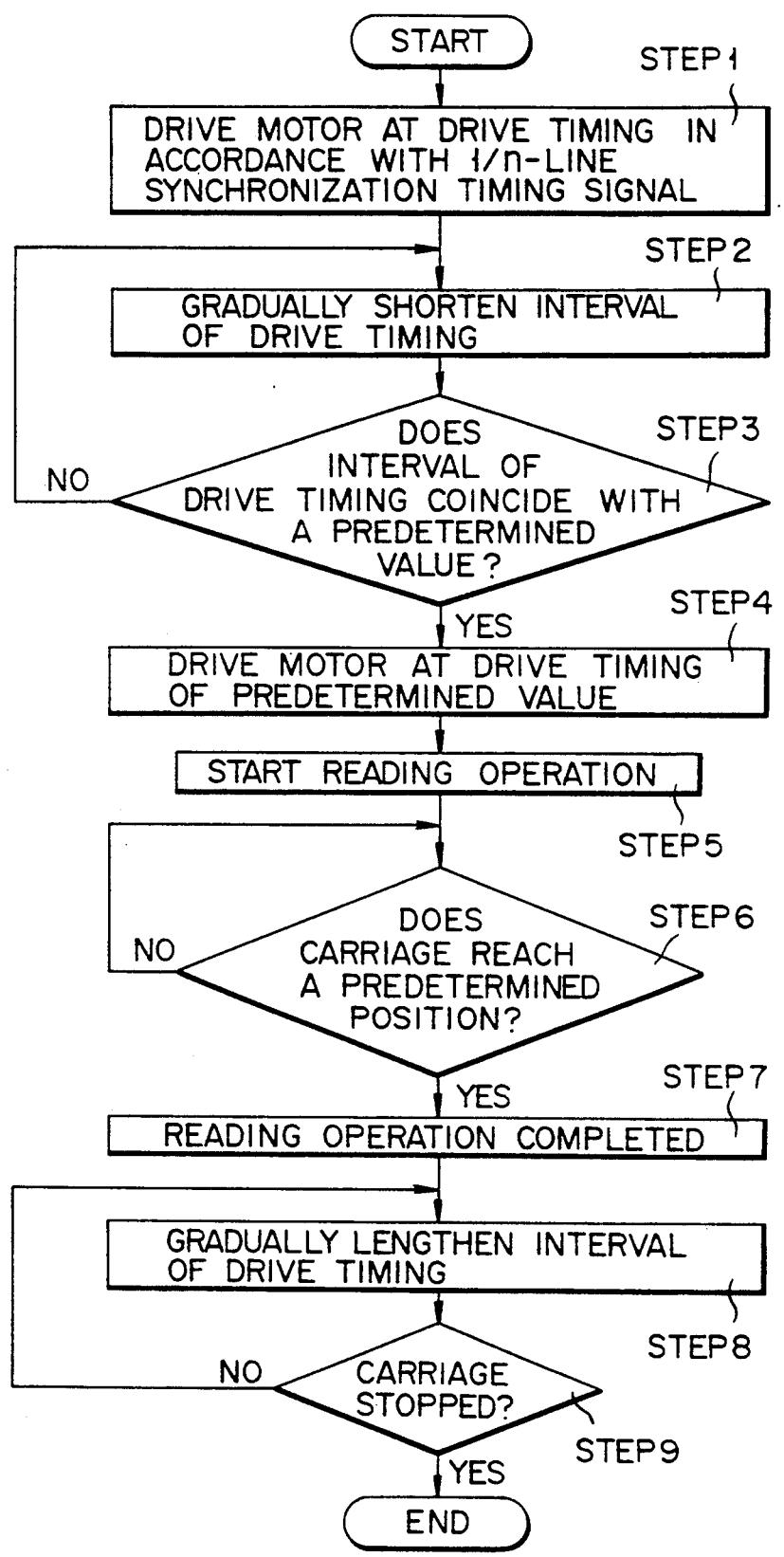
FIG. 6 is a flowchart for explaining an operation of the original reader apparatus shown in FIG. 2.

An operation of the above-described structure will now be described with reference to the flowchart shown in FIG. 6.

A reading operation is instructed by means of a start key (not shown). At this time, a 1-line synchronization timing signal is supplied from 1-line synchronization timing circuit 29 to CPU 21 and 1/n-line synchronization timing circuit 28. 1/n-line synchronization timing circuit 28 divides the 1-line synchronization timing signal into two parts, and outputs a ½-line synchronization timing signal to CPU 21.

CPU 21 causes motor driving section 26 to operate at a stepping motor drive timing of long interval, in synchronism with the ½-line synchronization timing signal supplied from 1/n-line synchronization timing circuit 28, thereby rotating stepping motor 10 (STEP1). By virtue of the rotation of stepping motor 10, carriage 7 is moved in a direction perpendicular to that in which photoelectric converter 5 reads the original, along with lamp 4, and optical system 6, both mounted on carriage 7.

Thereafter, CPU 21 causes motor driving section 26 to operate such that the interval of the stepping motor drive timing gradually becomes shorter. In other words, motor driving section 26 is accelerated, thereby accelerating stepping motor 10 (STEP2).

When the interval of the stepping motor drive timing coincides with a predetermined interval (STEP3), CPU 21 determines that the moving speed of carriage 7 coincides with a predetermined speed. Thereafter, motor driving section 26 is driven at a stepping motor drive timing of a constant interval, and thus stepping motor 10 is driven at a constant speed (STEP4). Accordingly, carriage 7, and lamp 4, photoelectric converter 5, and optical system 6 which are mounted thereon, are moved at a constant speed.

Then, when carriage 7 and the elements mounted thereon reach a predetermined start position, CPU 21 determines that an original reading operation should be started (STEP5), and thus instructs light source control section 25 to turn on lamp 4, and causes photoelectric converter 5 to perform a photoelectric conversion of one line, in synchronism with a 1-line synchronization timing signal supplied from 1-line synchronization timing circuit 29.

An electric signal or analog data output from photoelectric converter 5 is converted to digital data by analog-to-digital converter 27, and is output to normalization circuit 23, where it is normalized on the basis of the reference data stored in memory 24, and is itself subsequently stored therein.

When carriage 7 moves to a predetermined end position (STEP6), CPU 21 determines that an original reading operation is completed (STEP7), and thus instructs light source control section 25 to turn off lamp 4, and causes motor driving section 26 to operate such that the interval of the stepping motor drive timing gradually becomes longer, in synchronism with a ½-line synchronization timing signal. In other words, the operation speed of motor driving section 26 is decreased, whereby stepping motor 10 is rotated at lower speed (STEP8). Accordingly, carriage 7, lamp 4, photoelectric converter 5, and optical system 6 mounted on carriage 7 are moved at lower speed, and finally stop (STEP9).

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An original reader apparatus comprising:

first means for generating a first pulse of a predetermined frequency;

reading means for reading line by line an original in synchronism with the first pulse;

second means, for generating, in synchronism with the first pulse, a second pulse of a frequency higher than that of the first pulse;

third means, for generating a third pulse in synchronism with the second pulse, the frequency of said third pulse varying from a value less than that of the first pulse to a constant value greater than that; and moving means for moving step by step, in accordance with the frequency of the third pulse, said reading means relative to said original, along an axis perpendicular to that along which the reading means reads the original.

2. An original reader apparatus according to claim 1, wherein said reading means is constituted by a lamp, an optical system, and a photoelectric converter.

3. An original reader apparatus according to claim 1, wherein said first means is constituted by an oscillator and a frequency divider.

4. An original reader apparatus according to claim 1, wherein said second means is constituted by a frequency divider.

5. An original reader apparatus according to claim 2, wherein said photoelectric converter is constituted by a CCD line image sensor.

* * * * *